(12) United States Patent
Koch

(10) Patent No.: US 6,276,894 B1
(45) Date of Patent: Aug. 21, 2001

(54) METHOD AND DEVICE FOR DRAWING CONDENSATE OFF FROM COMPRESSED-GAS SYSTEMS

(76) Inventor: Berthold Koch, Pützstrasse 4, D-41468, Neuss (DE)

( * ) Notice: Subject to any disclaimer, the term of this patent is extended or adjusted under 35 U.S.C. 154(b) by 0 days.

(21) Appl. No.: 09/117,561
(22) PCT Filed: Nov. 7, 1996
(86) PCT No.: PCT/DE96/02118
§ 371 Date: Oct. 8, 1998
§ 102(e) Date: Oct. 8, 1998
(87) PCT Pub. No.: WO97/28400
PCT Pub. Date: Aug. 7, 1997

(30) Foreign Application Priority Data

Jan. 30, 1996 (DE) .............................................. 196 03 202

(51) Int. Cl.[7] .................................................. F01D 25/00
(52) U.S. Cl. .............................. 415/13; 415/51; 415/118; 415/169.2; 137/187; 137/204
(58) Field of Search ................................. 137/392, 395, 137/204, 203, 624.15, 187, 177; 415/13, 51, 118, 169.2

(56) References Cited

U.S. PATENT DOCUMENTS

| | | | |
|---|---|---|---|
| 2,564,873 | * 8/1951 | Wright | 137/187 |
| 3,575,199 | * 4/1971 | Beattie | 137/341 |
| 3,845,778 | * 11/1974 | Bridigum | 137/204 |
| 3,916,936 | * 11/1975 | Villaume et al. | 137/204 |
| 4,261,382 | * 4/1981 | Bridges | 137/187 |
| 4,336,821 | * 6/1982 | Frantz et al. | 137/187 |

* cited by examiner

*Primary Examiner*—Edward K. Look
*Assistant Examiner*—James M. McAleenan
(74) *Attorney, Agent, or Firm*—John Lezdey

(57) ABSTRACT

A method for draining condensate off a compressed-gas system that traps condensate that collects during operation of the compressed-gas system, draws off collected condensate through an outlet, connects a trap volume and a purging device to the outlet, connects a collection chamber to the outlet, detects the presence of condensate in the collection chamber by at least one sensor, connects control electronics to the sensor, controls a valve arrangement by the control electronics that either shuts the purging device so that no condensate can escape through it or opens the purging device each time the condensate level rises and the sensor changes over from indicating "no condensate" to indicating "condensate present", starts the timer circuit and on expiry of the time defined by the timer circuit, opens the valve until the sensor indicates "no condensate" thereupon closing the purging device with the valve.

12 Claims, 3 Drawing Sheets

METHOD AND DEVICE FOR DRAWING CONDENSATE OFF FROM COMPRESSED-GAS SYSTEMS

BACKGROUND OF THE INVENTION

1. Field of the Invention

The invention relates to a method for draining condensate from compressed-gas systems, an arrangement hereof as well as the use of a device for draining off condensate for a method for draining condensate from compressed-gas systems.

2. Description of the Prior Art

A method for draining condensate from compressed-gas systems as for example a compressed air-, steam- or other systems, is known from the EP 391 250 B1 which teaches a device for draining off condensate in a special construction. This device for draining off condensate embodies a known arrangement for draining off condensate from compressed-gas systems.

Furtheron a method and a device for draining condensate off is known from GB-A-2074702, this device is suited for vapor-pressure units. In a T-shaped housing a sensor protrudes into a collection chamber, in which condensate can accumulate. When the sensor, senses condensate, a time delay circuit is activated, which opens an outlet valve but after a certain time after the sensing. Thereby, in a like way as in the JP-A-06 066 399, it is avoided that the outlet valve opens and closes too often and even for very small amounts of condensate.

According to the known state of the art the condensate draining from the compressed gas system is collected in a trap of the device for draining off condensate. At least one sensor, which registers the level of the condensate, preferably two such sensors are provided at different heights, project into the trap. As soon as the trap is filled up to the height of the upper sensor, a draining off process starts. The control electronics, which are provided in the device for draining off condensate, opens a solenoid valve, whereby the pressure in a control chambers of a diaphragm valve is diminished. The same is thereby lifted off its seat and gives way for the condensate to an outlet.

According to the state of the art the volume of the trap should be in a certain sensible relation to the amount of condensate which is collected in a certain timely process. The volume should be that large that the valve arrangement does not have to be opened too many times. If the trap is too small, then a variety of tappet clearances occur. A valve, may it be a diaphragm valve or an electromagnetic valve, possesses parts which are mechanically moved and which are subject to wear and tear. A secure function of the valve can only be ensured for a certain number of tappet clearances. If the trap is constructed too small, the number of tappet clearances is reached relatively fast, for example after a few weeks already or even earlier.

According to the state of the art large devices for draining off condensate with large traps are therefore provided for compressed-gas systems with a high amount of condensate, graduated to the needs there are a number of smaller devices for draining off condensate.

However, the larger devices for draining off condensate are clearly more expensive than the smaller ones and one tends to use a device for draining off condensate, which is as small as possible, because of the financial aspect. This again leads to a restriction of the service life of the movable parts.

SUMMARY OF THE INVENTION

This is where the invention starts. It is the task of the invention to declare a method for draining condensate off compressed-gas systems and an arrangement for such a draining off process, whereby a purging device which is of fairly small dimensions, can be used. This leads to another kind of usage of known devices for draining off condensate than according to the state of the art.

This task is solved according to the procedure by a method of draining condensate off from compressed-gas, e.g. compressed-air systems, by the fact that 1) a trap for condensate is provided, in which condensate collects during operation of the compressed-gas system, the trap has an outlet through which the condensate, which collects can be drawn off and
2) a purging device is connected to the outlet and which has a) a sensor intended to detect the presence of condensate in the purging device, b) which comprises control electronics connected to the sensor including a timer circuit and c) which comprises a valve controlled by the control electronics and which influenced by the sensor, either shuts the purging device so that no condensate can escape through it or opens it each time the condensate level rises and the sensor switches over from indicating "no condensate", to indicating "condensate present", thus starting the timer circuit. On expiry of the time defined by the circuit, the valve is opened until the sensor indicates "no condensate" again, when the valve closes the purging device again.

In accordance with the device the task is solved by an arrangement according to claim 3.

According to the invention the collection of condensate in a trap, which itself has no devices built in for a purging device, namely preferably does not comprise any sensors. A purging device is provided, which may have its own chamber itself, but which does not necessarily have it. This purging device may be used for draining off condensate as it is known from the EP 391 250 B1, and built in a simpler manner, such as in a tubular shape. At least one sensor positioned in the purging device is sufficient for the method according to the invention.

A decisive factor however is the control of the purging device. As the separate trap, which can be embodied relatively large, is emptied above the purging device, the valve arrangement of the purging device can stay in an open state for a relatively long amount of time and with it large amounts of condensate can be purged without the need of many tappet clearances.

The valve arrangement of the purging device is opened as soon as a period of time dictated by the timer circuit, has passed. The timer circuit is started, when the signal of the sensor switches from indicating "no condensate" to indicating "condensate present". The valve arrangement is shut again when the sensor switches from indicating "condensate present" to indicating "no condensate".

This method may be described as follows: In the trap, which preferably, but not necessarily, is part of the compressed-gas system, condensate is collected during operation of the system. As soon as the sensor switches from indicating "no condensate" to indicating "condensate present", a time gate is opened, and within the time span dictated by this time gate the condensate can collect in the trap. The length of this time gate is the so-called time span. The time span is measured to maintain the that sufficient, operational security of the compressed-gas system—but not too much condensate can collect in the trap. When the time span has run out and thereby the time gate is shut, the valve arrangement is opened. Only the condensate collected within the time span can be drawn off. As soon as it is drawn off, the sensor switches from indicating "condensate present" to indicating "no condensate", this again leads to shutting the valve arrangement.

Accordingly, the high amount of valve actuations necessary in devices for draining condensate off according to the prior art are avoided. A relatively small device can be used which is simpler and more inexpensive than known devices. For the producer of compressed-gas systems, for example compressed-air systems, this results in the possibility that the trap can be provided at a suitable position of the system. With regard to construction and costs this is simpler than to provide a separate chamber of sufficient volume in a device for draining off condensate. The trap may also be a separate receptacle, which is embodied in a relatively simple manner, and is connected to the compressed-gas system in a suitable manner. Similarly, the purging device is separately arranged again.

The time span, during which condensate, is collected, can be adjusted. That way the control electronics, can adjust to the respective operational conditions to save the time of drain off and evaluation. For example, the control electronics can be connected with the electric part of the compressed-gas system in such a way that the control electronics are informed via the on-position and the switch-off position of the compressed-gas system, as the case may be also via the different operational conditions. That way the time span can be adjusted, for example it can be interrupted, if and as long as the compressed-gas system or the matching distributor is switched off.

Prior art devices can be adapted for use of the present method. These may have their own collection chamber, but this can be remarkably smaller with regard to its collection chamber volume, for example at least 10 times, preferably 100 times smaller than the volume of the trap. Due to that a relatively large flow of condensate can be controlled with relatively small devices for draining off condensate, without having to accept too many tappet clearances. For the method according to the invention the devices for draining off condensate as already known have to be equipped with a timer circuit and the electronic switch has to be embodied in such a way that the valve arrangement opens up only after the time span of the time gate has run out. The invention therefore relates to a new concept for draining condensate off from compressed-gas systems. It no longer relates to separately attachable devices for draining off condensate, which alone perform the entire process of draining off condensate—even though such devices can be used—but it offers a combined solution, which enables the producer of compressed-gas systems, to provide a trap for condensate in the compressed-gas system itself. This to drastically lowers the costs for the precautions for draining off condensate.

In a completely different embodiment the upper level of the condensate in the compressed-gas system is not estimated via a time span but actually registered. For this a second sensor, which is adjusted onto the maximum level, with which the process of draining off is started via the valve arrangement, projects into the trap via the outlet. The shutting of the valve arrangement occurs as described already. The second sensor may also be arranged close to a connection of the trap, which is placed above the outlet and which is connected via an electric conduction with the actual purging device.

Further advantages and characteristics of the invention derive from the other claims as well as the following description of a non-restrictive embodiment of the invention, which is illustrated further with regard to the draining.

DESCRIPTION OF THE PREFERRED EMBODIMENTS

Figure 1:
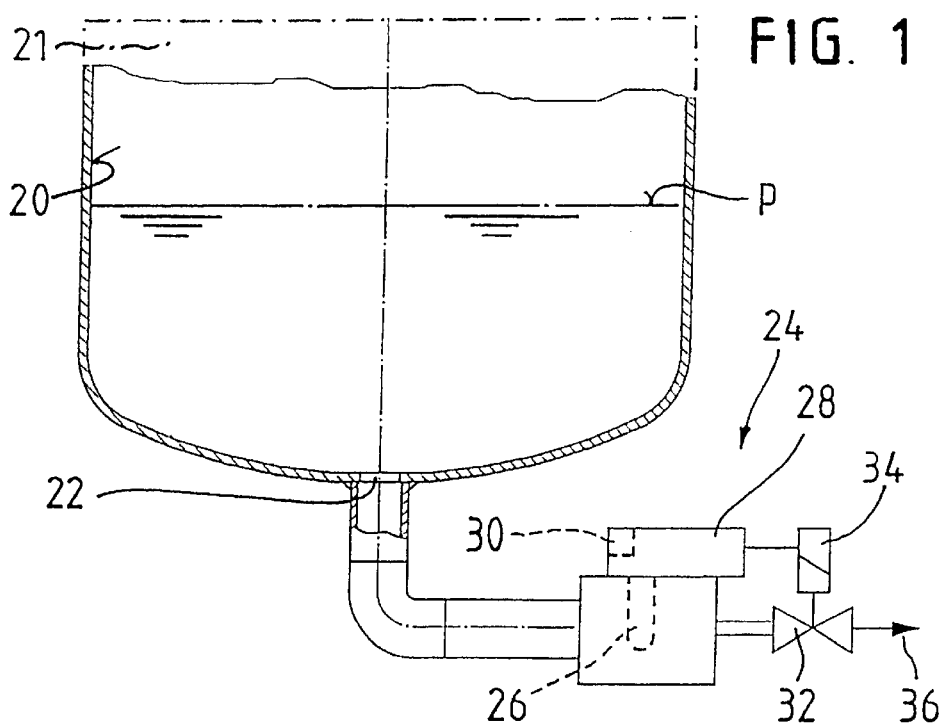
FIG. 1 an arrangement for draining off condensate with a trap illustrated in a sectional draining and a purging device, which is connected to an outlet, which is positioned at the deepest position of the trap, FIG. 2 an illustration similar to the one in FIG. 1, but this time with an outlet, which is positioned at a slightly higher position within the trap, FIG. 3 an illustration according to FIG. 1, whereas an already known device for draining off condensate, which is essentially illustrated in a sectional draining, is used as a purging device, FIG. 4 an illustration similar to FIG. 2, whereas an already known device for draining off condensate, which is essentially illustrated in a sectional draining, is used as a purging device FIG. 5 an illustration of the level p within the trap illustrated above the time t.

The figures each illustrate a trap 20 of a known compressed-gas system. The the trap is developed by a dense receptacle, which comprises a suitable trap volume and which is connected with the actual compressed-gas system 21 at its upper area in a manner already known. At the bottom, the trap 20 has an outlet 22, which is positioned at its lowest position. In the trap 20 there is condensate, the level of the condensate has the level p.

The outlet 22 is connected with a purging device 24 via a suitable pipe connection. It has a simple, for example tubular frame, into which a sensor 26 projects. The same is connected with control electronics 28, which are preferably placed in a separate part of a frame and in the illustrated embodiment it is above the tubular frame, which is illustrated here as an example of the embodiment. A timer circuit 30 belongs to this control electronic device 28. Finally a valve arrangement is provided which consists of a main valve 32 and a control valve 34 which can be operated electromagentically, the control valve 34 is connected to the control electronics 28. The main valve 32, which is preferably embodied as a diaphragm valve, locks the outlet device in such a way that no condensate can escape through it, or it releases the same in such a way that the condensate may flow out as illustrated with the arrow 36.

Figure 2:
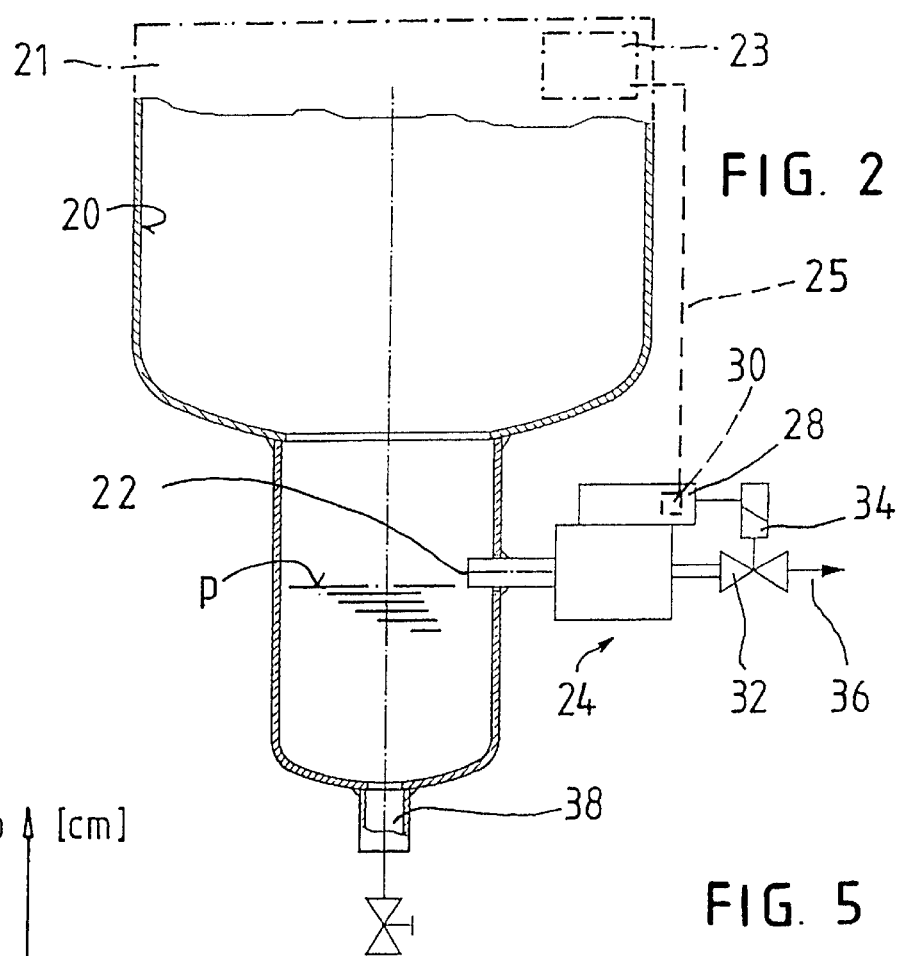

The embodiment according to FIG. 2 illustrates an alternative to the embodiment according to FIG. 1. The outlet 22 is not provided at the lowest position possible of the trap 20, but at a certain height, above the deepest position possible. At the deepest position there is an additional outlet 38. The trap 20 cannot be completely emptied by the purging device 24, but rather condensate remains below the level of the outlet 22. In this area larger kinds of soil particles may sediment and from there may be purged regularly or irregularly via the additional outlet 38. Because of that, larger particles, which may cause a malfunction of the valve function of the purging device 24, which operates automatically, cannot reach the same.

The compressed-gas system 21 has an electronic control 23, which is connected via a conduction 25 with the control electronics 28. That way the control electronics 28 receives information via the state of the compressed-gas system 21. That way the course of the timer circuit 30 can be stopped, if and as long as the compressed-gas system is switched off. Furthermore, the control electronics 28 can receive information about the performance power of the compressed-gas system 21. If working with a high power, then more condensate is produced and because of that, the time span of the timer circuit 30 needs to be shortened, when working with less power however, it can be prolonged. Finally it is advantageous, to supply the control electronics 28 with further parameters, for example with a compressed-gas system the information about the temperature of the outer air, which is taken in, because based on the temperature, different amounts of condensate may occur and the time span of the timer circuit 30 can be varied via the temperature.

Figure 3:
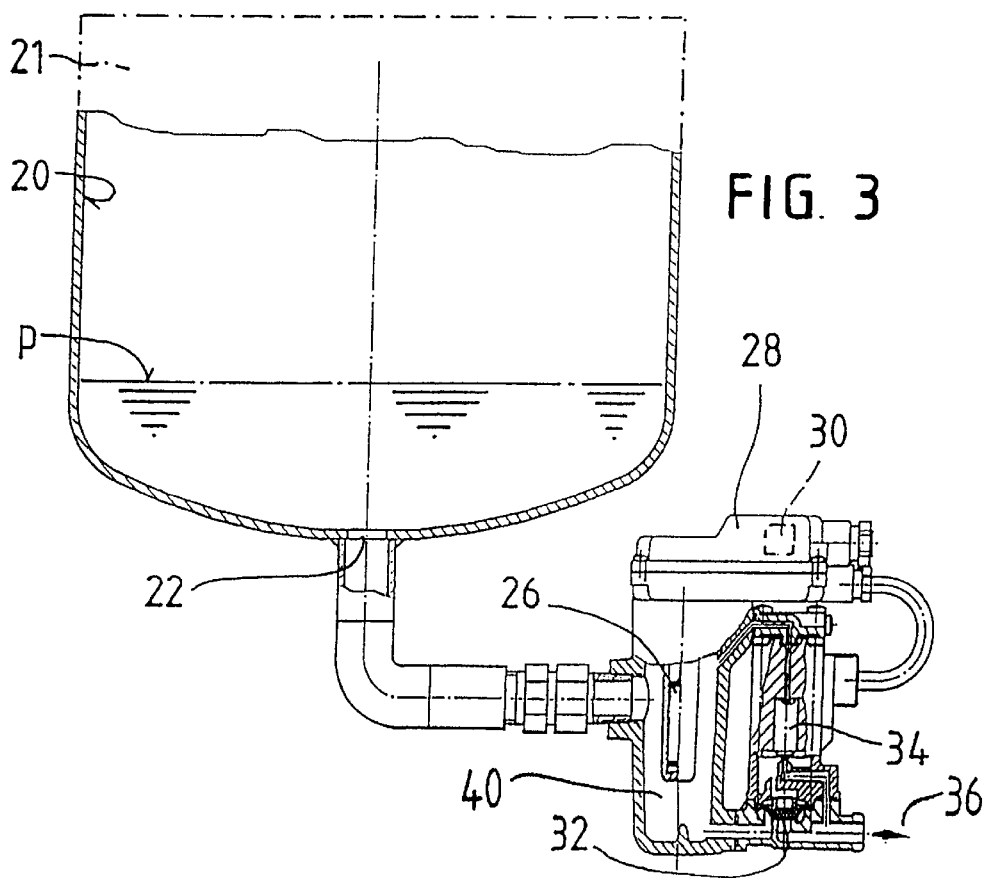

The embodiment according to FIG. 3 essentially corresponds to the embodiment already discussed in FIG. 1, however, instead of a relatively simple purging device a prefabricated part is used, as it is already known by the state of the art, namely a device for draining off condensate, as it is known for example from the EP 391 250 or as it is already manufactured and offered by the firm BEKO Condensate-Technology Ltd. Neuss. As such devices for draining off condensate are already a part of the state of the art, it is not necessary to describe them in detail. The description much rather draws attention to the differences, which are necessary for the comprehension of the invention, including the alterations, which have to be performed on the device for draining off condensate, which is already known.

The device for draining off condensate, which is already known, which has the same reference number here as the purging device 24, has its own chamber 40, which is remarkably smaller than the volume of the trap 20. This is a direct result as illustrated in FIG. 3, even if the trap 20 is illustrated as if it were unlimited to the top. The chamber 40 is not used as a trap according to the invention but, much rather as a space, into which the sensor 26 projects. In FIG. 3 the electromagnetic control valve 34 is illustrated in detail, furthermore the main valve 32 is provided with a diaphragm. Above the diaphragm there is a control chamber, which continuously communicates via an inlet channel with the upper area of the chamber 40, in which compressed air and not condensate can be collected during the practical operation. The control valve 34 is positioned in an outlet channel, through which the control chamber can be connected with the outlet for condensate (arrow 36).

The control electronics 28 is positioned in a separate chamber in the upper area of the purging device 24. It is supplemented by a timer circuit 30. The same is started, if the level of condensate rises in the chamber 40 to such a level that the sensor 26 changes from indicating "no condensate" to indicating "condensate present". For the duration of time of the time span (also called time gate), dictated by the timer circuit 30, condensate can collect in the trap 20 thereby condensate also collects in the chamber 40. Compressed air remains in the chamber 40 above the level of the inlet into the chamber 40. The inlet channel also ends in this area In a preferred embodiment the duration of the time gate can be adjusted within certain limitations, for this, preferably a potentiometer or some device of a similar kind is provided.

If the time span has run out, the valve arrangement 32, 34 is opened and condensate can escape as long as the sensor 26 changes again from indicating "no condensate present" to indicating "no condensate". With this sensor indication the valve arrangement 32,34 is shut again.

It is possible to use the sensor signal not directly for controlling the valve arrangement 32,34, but only indirectly for example via an intermediate circuit element of a further timer circuit.

Figure 4:
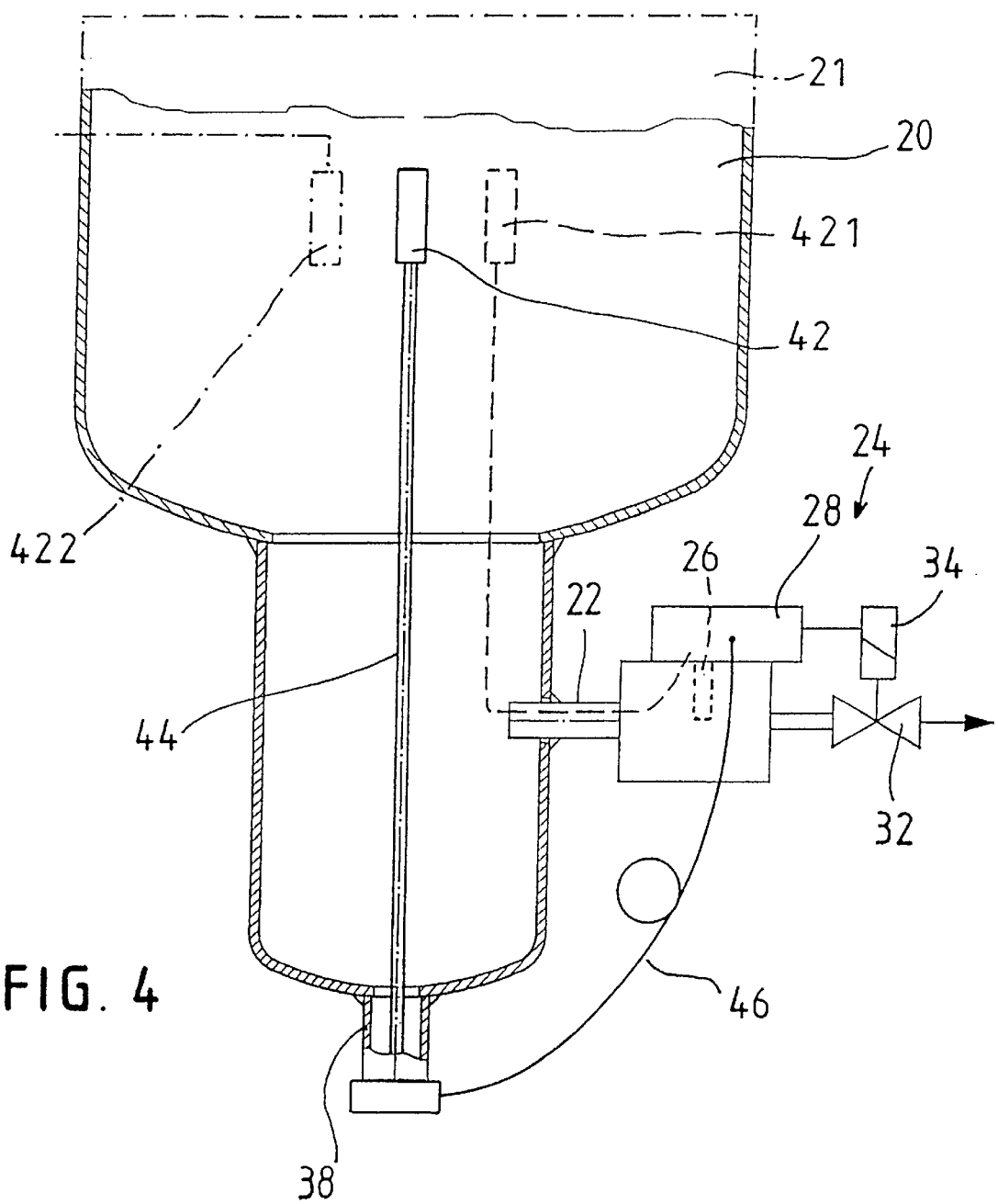

An alternative to the embodiments already described so far, is illustrated in the embodiment according to FIG. 4. Here a second sensor 42 is provided, which is positioned in the trap 20, namely projects into the same in any shape desired. The maximum level is not registered by the time span, which is dictated by the timer circuit 30, but actually measured by the second sensor 42. A timer circuit is not necessary for the embodiment according to FIG. 4.

In FIG. 4 three different possibilities of the arrangement of the second sensor 42 are illustrated. A sensor 42 is illustrated in a draw-out line, which projects through the additional outlet 38 and which is positioned at the height of the level of the trap 20 up to which the condensate is supposed to rise. Another embodiment of the second sensor 421 is illustrated in a dotted line, this time the sensor 421 projects through the same outlet 22, onto which the purging device 24 is arranged. Finally another embodiment is illustrated in a dot-dash line with which an additional outlet is provided, which is positioned at about the height of the maximum level of the condensate in the trap 20, through this additional outlet the sensor 422 projects, which is illustrated in a dot-dash line.

In an embodiment illustrated with drawn-out lines a sensor 42 is positioned at the end facing the front of a flexible, thin tube 44. The tube 44 takes up the feeding pipes to the sensor 42. It is sufficiently stiff, that it does not bent in the normal operation, but it can be bent manually and adjusted in such a way that it can be suited into the respective geometrical conditions of the trap 20. The sensor 42 is connected outside the additional outlet 38 via a flexible electrical conduction 46 with the control electronics 28. The length of this conduction is adjusted to the respective requirements.

The embodiment according to FIG. 4 functions as follows: Initially the valve arrangement 32, 34 is shut, condensate can collect in the trap 20. If it reaches the level of the second sensor 42, the valve arrangement 32,34 is opened and stays open as long as the signal changes at the first sensor 26 indicating from "condensate present" to indicating "no condensate". With this signal the valve arrangement 32,34 is locked again, a new cycle starts.

Figure 5:
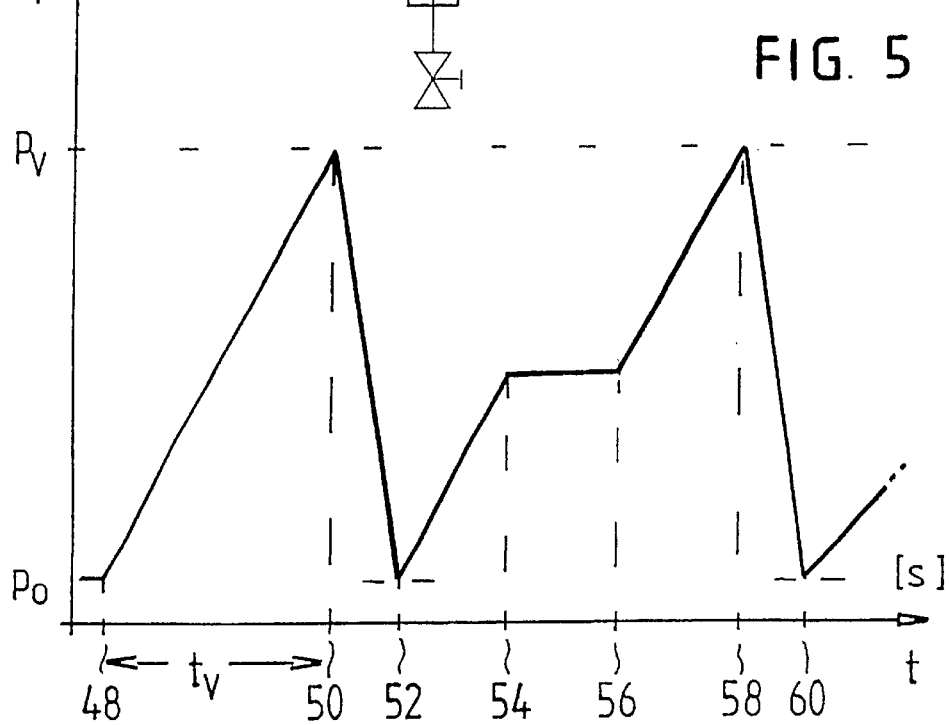

Based on the diagram, represented in FIG. 5, the operation of the embodiments according to the FIGS. 1 to 3 will be explained in the following: At the time 48 the valve arrangement 32, 34 is shut, condensate is released by the compressed-gas system 21 and collects in the trap 20.

What is claimed is:

1. A method for draining condensate off a compressed-gas system, said method comprising the steps of trapping condensate that collects during operation of said compressed-gas system; drawing off collected condensate through an outlet; connecting a trap volume and a purging device to said outlet; connecting a collection chamber having drain with a valve arrangement consisting of a diaphragm valve and a solenoid valve controlling said drain, to said outlet, said collection chamber volume being smaller than the trap volume; detecting the presence of condensate in said collection chamber by means of at least one sensor; connecting control electronics to said sensor, said sensor including a timer circuit and; controlling a valve arrangement by the control electronics that is influenced by said sensor; either shutting the purging device so that no condensate can escape through it or opening the purging device each time the condensate level rises and the sensor changes over from indicating the signal of no condensate, to indicating the signal of condensate present; starting the timer circuit and on expiry of the time defined by the timer circuit, opening the valve until the sensor indicates no condensate thereupon closing the purging device by means of the valve.

2. The method according to claim 1 wherein said time defined is sufficient to enable condensate to escape in an amount that is greater than the volume of said collection chamber.

3. An apparatus for draining condensate off a compressed-gas system, said apparatus comprising: a trap for condensate to collect during the operation of said compressed-gas system; an outlet, said collected condensate flowing to said outlet; a trap volume, and a purging device, said purging device having a collection chamber, said collection chamber being connected to said outlet and said collection chamber providing for a collection chamber volume that is smaller than the trap volume; said purging device further comprising a sensor with which condensate collected in it can be registered in the positions of the signal no condensate and the signal of condensate present, said purging device further comprising control electronics which are connected with said sensor and which comprise a timer circuit; said purging device further comprising a valve arrangement controlled by said control electronics that either blocks said purging device in such a way that no condensate can flow through it or release, said purging device, and said sensor being connected with the timer circuit in such a way that said timer circuit is started when it switches from indicating the signal of no condensate to indicating the signal of condensate present, after one of the dictated time spans has passed, the control electronics send a control signal to the valve arrangement in such a way that said valve arrangement is opened and the control electronics send a signal to the valve arrangement in such a way that it effects a closing of the valve arrangement if the sensor switches from indicating "condensate present" to indicating "no condensate".

4. The apparatus according to claim 3 wherein said trap is part of said compressed-gas system.

5. The apparatus according to claim 3 wherein said trap is formed by a separate receptacle, which is connected with said compressed-gas system at a point where condensate occurs.

6. The apparatus according to claim 3 wherein said purging device is positioned outside the trap.

7. The apparatus according to claim 3 wherein said trap volume is at least a hundred times larger than the collection chamber volume.

8. The apparatus according to claim 3 wherein said control electronics comprise a program, in which at least the last time span of the last opening of the valve arrangement is stored.

9. A device for draining off condensate for a compressed-gas system said device having a frame which has a collection chamber volume and further comprising a collection chamber for condensate, said collection chamber being connectable to said compressed-gas system, and further comprising a drain, said drain having a valve arrangement consisting of a diaphragm valve and a solenoid valve controlling said drain, and said drain having an electronic control switch, said switch comprising at least one sensor said sensor projecting into said collection chamber and said sensor registering the condensate collected therein indicating from the signal of no condensate to condensate present for draining condensate off a compressed-gas system said system having a trap for condensate to collect during operation, said trap having an outlet through which the condensate collected can drain and further having a trap volume, which is larger than said collection chamber volume, and whereby said electronic control switch comprises a timer circuit, which is started when the sensor signal changes from indicating the signal of no condensate to indicating the signal of condensate present and said valve arrangement switches into the conducting state after the time span dictated by the timer circuit has passed, thereafter said valve arrangement is switched back into the state of blocking when the signal at the sensor switches from indicating the signal of condensate present to indicating the signal of no condensate.

10. The method of claim 1 wherein said collection chamber volume is at least ten times smaller than said trap volume.

11. The apparatus of claim 3 wherein said collection chamber volume is at least ten times smaller than said trap volume.

12. The apparatus of claim 9 wherein said trap volume is at least ten times larger than said collection chamber volume.

* * * * *